US010638266B2

(12) United States Patent
Huang et al.

(10) Patent No.: US 10,638,266 B2
(45) Date of Patent: Apr. 28, 2020

(54) USER EQUIPMENT POSITIONING IN LONG-TERM EVOLUTION COORDINATED MULTIPOINT COMMUNICATION SYSTEMS

(71) Applicant: Intel Corporation, Santa Clara, CA (US)

(72) Inventors: Rui Huang, Beijing (CN); Yang Tang, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/301,352

(22) PCT Filed: Jun. 25, 2014

(86) PCT No.: PCT/CN2014/080672
§ 371 (c)(1),
(2) Date: Sep. 30, 2016

(87) PCT Pub. No.: WO2015/196376
PCT Pub. Date: Dec. 30, 2015

(65) Prior Publication Data
US 2017/0164143 A1    Jun. 8, 2017

(51) Int. Cl.
*H04W 4/029* (2018.01)
*G01S 5/02* (2010.01)
*H04B 7/024* (2017.01)
*H04W 84/04* (2009.01)

(52) U.S. Cl.
CPC ........... *H04W 4/029* (2018.02); *G01S 5/0236* (2013.01); *G01S 5/0252* (2013.01); *H04B 7/024* (2013.01); *H04W 84/042* (2013.01)

(58) Field of Classification Search
CPC ....... H04W 28/18; H04W 88/08; H04B 7/024

USPC ......... 455/456.1, 456.2, 456.3, 456.4, 456.5, 455/456.6, 457
See application file for complete search history.

(56) References Cited

U.S. PATENT DOCUMENTS

2013/0237247 A1* 9/2013 Lee .................... G01S 5/06
455/456.1
2014/0235273 A1* 8/2014 Ahn ................... G01S 5/0236
455/456.1

(Continued)

FOREIGN PATENT DOCUMENTS

| CN | 101682419 A | 3/2010 |
|---|---|---|
| CN | 103703385 A | 4/2014 |
| WO | 2012/096535 A2 | 7/2012 |

(Continued)

OTHER PUBLICATIONS

3GPP TSG-RAN WG4 Meeting #70 Bis R4-141586 San Jose del Cabo, Mexico, Mar. 31-Apr. 4, 2014 "Further study on the positioning enhancement in HetNet scenario" Source: Intel Corporation (Year: 2014).*

(Continued)

*Primary Examiner* — Shahriar Behnamian
(74) *Attorney, Agent, or Firm* — Fish & Richardson P.C.

(57) ABSTRACT

Embodiments of the present disclosure describe systems and methods for UE positioning in wireless networks. Various embodiments may include signaling of virtual identifiers associated with remote radio heads of a coordinated multipoint communication system and generating a positioning reference signal based on the virtual identifiers. Other embodiments may be described and/or claimed.

10 Claims, 6 Drawing Sheets

(56) References Cited

U.S. PATENT DOCUMENTS

2015/0319718 A1* 11/2015 Yang .............. H04W 76/15
370/252
2015/0341131 A1* 11/2015 Sano .............. H04W 16/28
370/329

FOREIGN PATENT DOCUMENTS

| WO | 2012/121774 A2 | 9/2012 |
|---|---|---|
| WO | 2012/128456 A2 | 9/2012 |
| WO | 2013/048210 A2 | 4/2013 |

OTHER PUBLICATIONS

3GPP, "Technical Specification Group Radio Access Network; Evolved Universal Terrestrial Radio Access (E-UTRA); Radio Resource Control (RRC); Protocol specification (Release 12)," 3GPP TS 36.331 V12.1.0 (Mar. 2014), Mar. 19, 2014, Lte Advanced, 356 pages.

3GPP, "Technical Specification Group Radio Access Network; Evolved Universal Terrestrial Radio Access (E-UTRA); Requirements for support of radio resource management (Release 12)," 3GPP TS 36.133 V12.3.0 (Mar. 2014), Mar. 27, 2014, Lte Advanced, 820 pages.

International Search Report and Written Opinion dated Mar. 25, 2015 from International Application No. PCT/CN2014/080672, 13 pages.

Intel Corporation, 3GPP, "Further study on the positioning enhancement in HetNet scenario," 3GPP TSG-RAN WG4 Meeting #70 Bis, San Jose del Cabo, Mexico, Mar. 31-Apr. 4, 2014, 4 pages.

Ericsson, 3GPP, "Solutions for OTDOA with RRH," 3GPP TSG-RAN WG4 Meeting #71, Seoul, South Korea, May 19-23, 2014, 3 pages.

Ericsson, 3GPP, "Methodology for studying E-CID with RRH," 3GPP TSG-RAN WG4 Meeting #71, Seoul, South Korea, May 19-23, 2014, 2 pages.

Extended European Search Report dated Oct. 23, 2017 for European Patent Application No. 14896112.1, 10 pages.

Office Action dated Dec. 12, 2017 from Japanese Patent Application No. 2016-569391, pages.

Sven Fischer., "Observed Time Difference of Arrival (OTDOA) Positioning in 3GPP LTE," Qualcomm Technologies, Inc, 3GPP LTE, Jun. 6, 2014, 62 pages.

Intel, "Further study on the positioning enhancement in HetNet scenario," 3GPP TSG-RAN WG4 Meeting #70 Bis, R4-141586, Agenda Item: 9.4.4, Mar. 31-Apr. 4, 2014, San Jose del Cabo, Mexico, 4 pages.

Chinese Patent Office—First Office Action dated Jul. 3, 2018 from Chinese Patent Application No. 201480079255.X, 37 pages.

Korean Patent Office—Notice of Preliminary Rejection dated Jul. 17, 2018 from Korean Patent Application No. 10-2016-7032241, 7 pages.

Japanese Patent Office—Decision to Refuse dated Apr. 17, 2018 from Japanese Patent Application No. 2016-569391, 6 pages.

European Patent Office—Article 94(3) dated Nov. 27, 2018 from European Patent Application No. 14896112.1, 5 pages.

Chinese Patent Office—Decision on Rejection dated Sep. 3, 2019 from Chinese Patent Application No. 201480079255.X, 29 pages.

Chinese Patent Office—Second Office Action dated Mar. 1, 2019 from Chinese Patent Application No. 201480079255.X, 32 pages.

* cited by examiner

```
-- ASN1START

OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement OTDOA-NeighbourCellInfoElement ::= SEQUENCE {
    physCellId                  INTEGER (0..503),
    cellGlobalId                ECGI                        OPTIONAL,    -- Need ON
    earfcn                      ARFCN-ValueEUTRA            OPTIONAL,    -- Cond NotSameAsRef0
    cpLength                    ENUMERATED {normal, extended, ...}
                                                            OPTIONAL,    -- Cond NotSameAsRef1
    virtualRRHID                INTEGER (1..8)              OPTIONAL,
    prsInfo                     PRS-Info                    OPTIONAL,    -- Cond NotSameAsRef2
    antennaPortConfig           ENUMERATED {ports-1-or-2, ports-4, ...}
                                                            OPTIONAL,    -- Cond NotSameAsRef3
    slotNumberOffset            INTEGER (0..19),            OPTIONAL,    -- Cond NotSameAsRef4
    prs-SubframeOffset          INTEGER (0..1279),          OPTIONAL,    -- Cond InterFreq
    expectedRSTD                INTEGER (0..16383),
    expectedRSTD-Uncertainty    INTEGER (0..1023),
    ...,
    [[ earfcn-v9a0              ARFCN-ValueEUTRA-v9a0       OPTIONAL     -- Cond NotSameAsRef5
    ]]
} maxFreqLayers   INTEGER ::= 3

-- ASN1STOP
```

```
-- ASN1START

OTDOA-ReferenceCellInfo ::= SEQUENCE {
    physCellId              INTEGER (0..503),
    cellGlobalId            ECGI                               OPTIONAL,    -- Need ON
    virtualRRHID            INTEGER(1..N)                      OPTIONAL,
    earfcnRef               ARFCN-ValueEUTRA                   OPTIONAL,    -- Cond NotSameAsServ0
    antennaPortConfig       ENUMERATED {ports1-or-2, ports4, ...}
                                                               OPTIONAL,    -- Cond NotSameAsServ1
    cpLength                ENUMERATED { normal, extended, ...},
        prsInfo             PRS-Info                           OPTIONAL,    -- Cond PRS
    ...,
    [[ earfcnRef-v9a0       ARFCN-ValueEUTRA-v9a0              OPTIONAL     -- Cond NotSameAsServ2
    ]]
}

-- ASN1STOP
```

USER EQUIPMENT POSITIONING IN LONG-TERM EVOLUTION COORDINATED MULTIPOINT COMMUNICATION SYSTEMS

CROSS REFERENCE TO RELATED APPLICATIONS

The present application is a national phase entry under 35 U.S.C. § 371 of International Application No. PCT/CN2014/080672, filed Jun. 25, 2014, entitled "USER EQUIPMENT POSITIONING IN LONG-TERM EVOLUTION COORDINATED MULTIPOINT COMMUNICATION SYSTEMS", which designates the United States of America, the entire disclosure of which is hereby incorporated by reference in its entirety.

FIELD

Embodiments of the present disclosure generally relate to the field of wireless communication, and more particularly, to user equipment positioning in long-term evolution coordinated multipoint communication systems.

BACKGROUND

Coordinated multipoint (CoMP) systems are being studied as an enhanced multiple input multiple output (MIMO) technique to increase performance, especially at the cell edge, within the evolution of Long-Term Evolution Advanced (LTE-A) for Release 11 or beyond. However, there are some challenges for user equipment (UE) positioning within CoMP scenarios.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Embodiments of the present disclosure describe the use of virtual identifiers that are associated with remote radio heads (RRHs) to facilitate measuring and/or estimating a position of a user equipment (UE) in coordinated multipoint (CoMP) systems.

Figure 1:
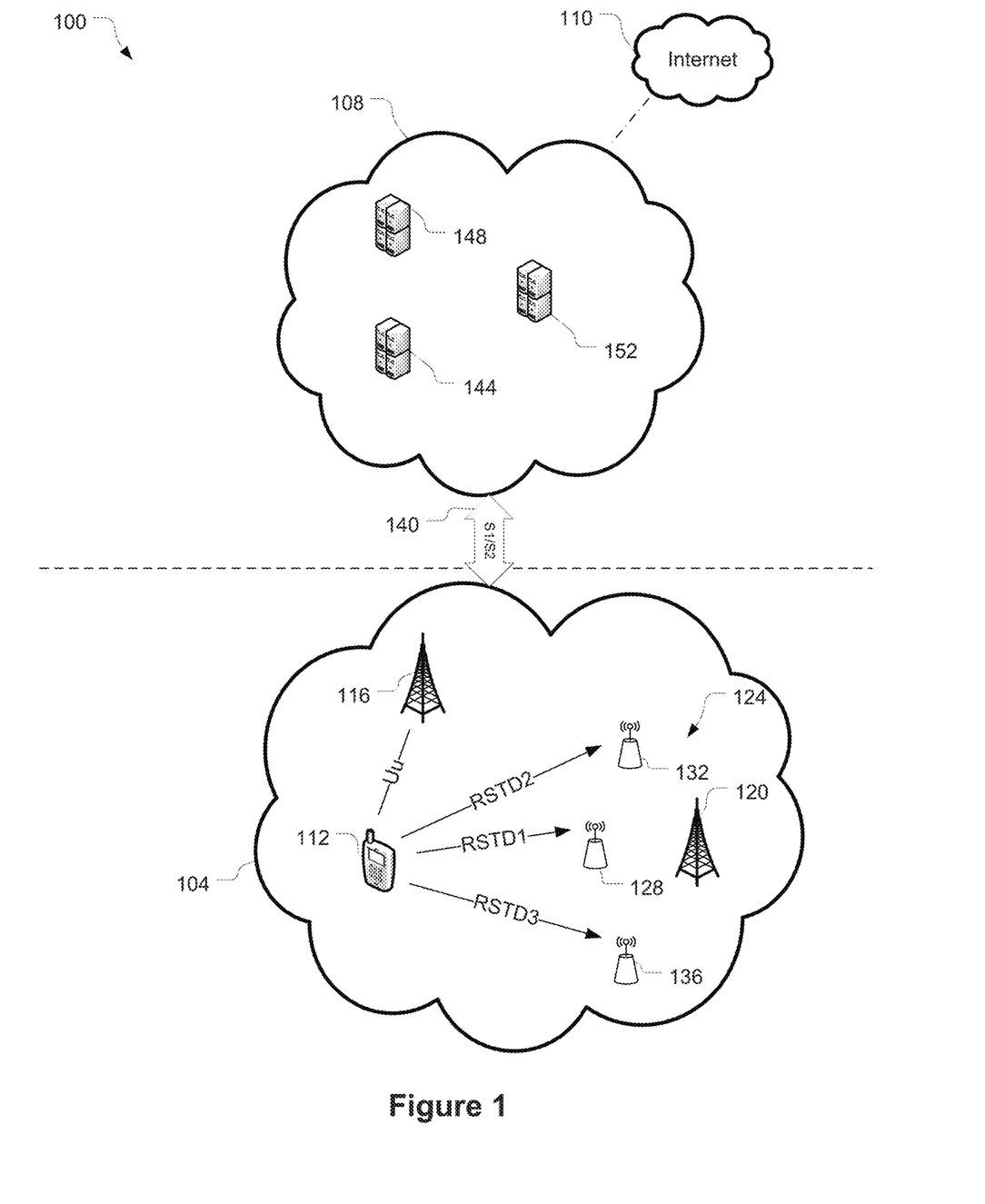
FIG. 1 illustrates an example wireless communication network in accordance with various embodiments.

FIG. 1 schematically illustrates a communication network 100 in accordance with various embodiments. The communication network 100 (hereinafter "network 100") may be a 3rd Generation Partnership Project (3 GPP) long-term evolution (LTE) network (or an LTE-Advanced (LTE-A) network). The network 100 may include a radio access network (RAN) 104 such as an evolved universal terrestrial radio access network (E-UTRAN) that provides wireless communication access to user equipment (UE). The network 100 may further include a core network 108 such as an Evolved Packet Core (EPC) that performs various management and control functions of the network 100 and further provides a communication interface between the access networks and other networks, e.g., Internet 110.

The RAN 104 may include various UEs, e.g., UE 112. The UE 112 is shown generally as a cellular phone but may be a variety of different wireless communication devices employed by a user in various embodiments. The RAN 104 may further include a number of eNBs, e.g., eNB 116 and eNB 120. The eNBs may coordinate and participate in various access functions of the RAN 104. In particular, for example the eNBs may provide wireless communication to the UEs of the RAN 104.

The eNB 120 may be part of a coordinated multipoint (CoMP) system 124 that further includes a plurality of RRHs, e.g., RRH 128, RRH 132, and RRH 136. The RRHs may provide remote transmission/reception capabilities to the eNB 120. The RRHs may be communicatively coupled with the eNB 120 through high-speed communication links, for example, fiber-optic links.

Components of the RAN 104, for example, eNBs 116 and 120, may be coupled with components of the core network 108 through an S1/S2 interface 140 or through some other appropriate communication interface.

The core network 108 may include, for example, a mobility management entity (MME) that provides control-plane signaling related to mobility and security for components of the RAN 104. In various embodiments, the MME may be responsible for the tracking and paging of UEs within the RANs. The MME may be the termination point of the Non-Access Stratum (NAS). The MME may support an S1 interface with eNBs of the RAN 104 and an S11 interface with a serving gateway (S-GW) 148 of the core network 108. While various specific interfaces are discussed herein, it will be understood that suitable variances may be made within the scope of the described embodiments.

The S-GW may provide user-plane signaling to transport IP data traffic between the UEs and external networks, e.g., the Internet. In FIG. 1, the MME and the S-GW may be combined in MME/S-GW 144.

The S-GW may be logically connected with another gateway, e.g., packet data network gateway (P-GW) 148. The P-GW 148 may also provide user-plane signaling and may serve as a point of interconnect between the core network 108 and other packet data networks (PDNs).

The core network 108 may further include a location-based services (LBS) server 152. The LBS server 152 may be coupled with other components of the core network 108 such as, for example, MME/S-GW 144, and may operate to determine locations of, and provide location-based services to, UEs disposed in the various RANs of network 100. The location-based services may include services such as, but not limited to, emergency services, advertising/marketing services, mapping services, etc. In some embodiments, the LBS server 152 may provide UEs of various RANs with information regarding positioning reference signal (PRS) configurations of assistance data reference and neighbor cells. This may facilitate the positioning measurements conducted by the UEs.

While certain of the components of the core network 108 are shown together, for example, the MME/S-GW 144, and others are shown separately, for example, the P-GW 148, it is to be understood that various modifications may be made within the scope of the embodiments of the present disclosure. For example, the MME and the S-GW may be disposed in separate devices, the P-GW and the S-GW may be disposed in one device, etc.

As discussed above, CoMP systems may improve various performance metrics of network communication; however, in the realm of positioning measurements, present CoMP systems may inject ambiguity. This may be due to current positioning measurement operations being based on parameters that are identified by a cell ID of reference cell and neighbor cells. A UE performing positioning measurements based on PRSs transmitted from RRHs having a common cell ID may distort positioning measurements such as observed time difference of arrival (OTDOA), enhanced cell ID (ECID), etc. Therefore, embodiments of the present disclosure introduce the use of virtual identifiers that are associated with the various RRHs to improve the accuracy and reliability of positioning measurements performed by UEs served by, or neighbors to, CoMP-system cells.

Figure 2:
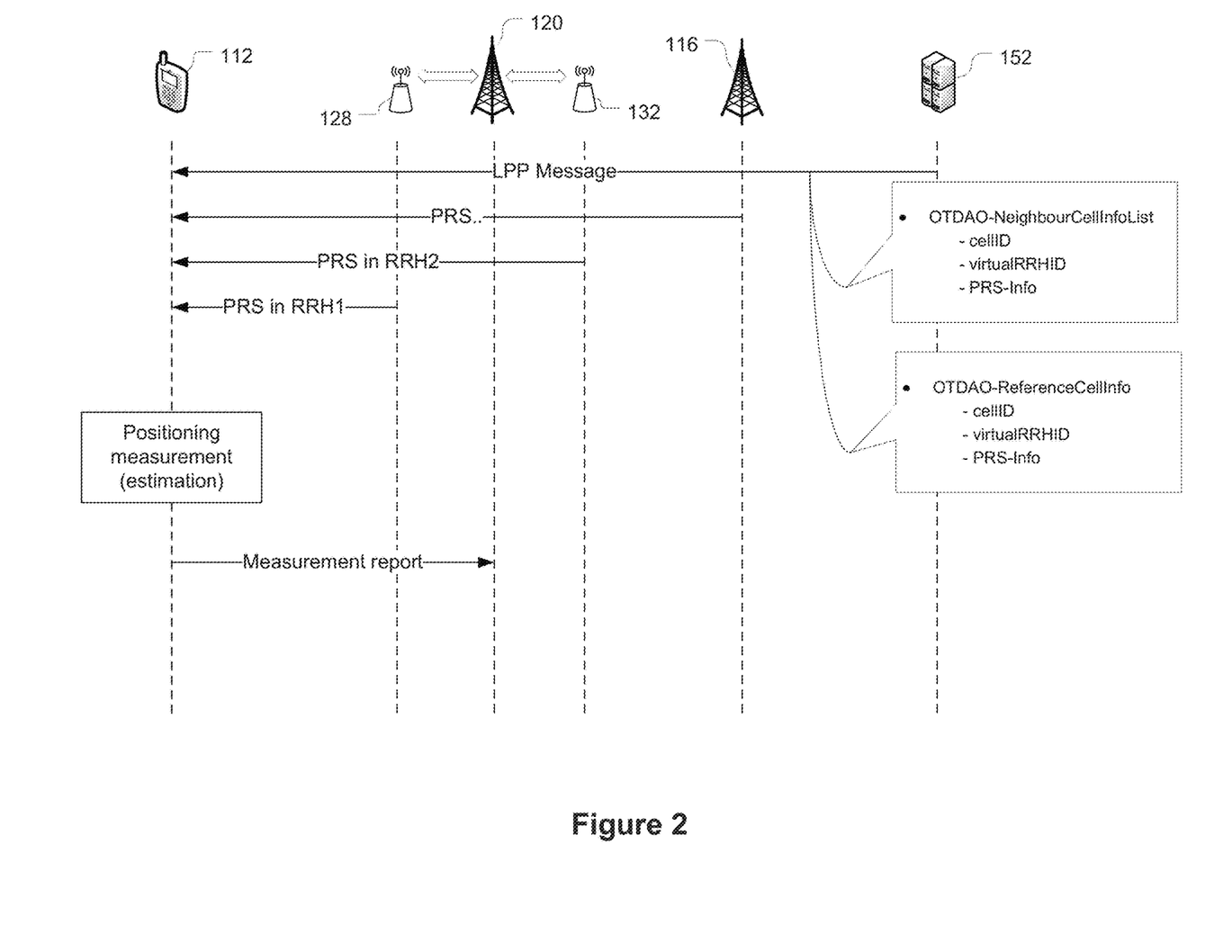
FIG. 2 is a diagram of a message flow in accordance with various embodiments.
Figure 3:
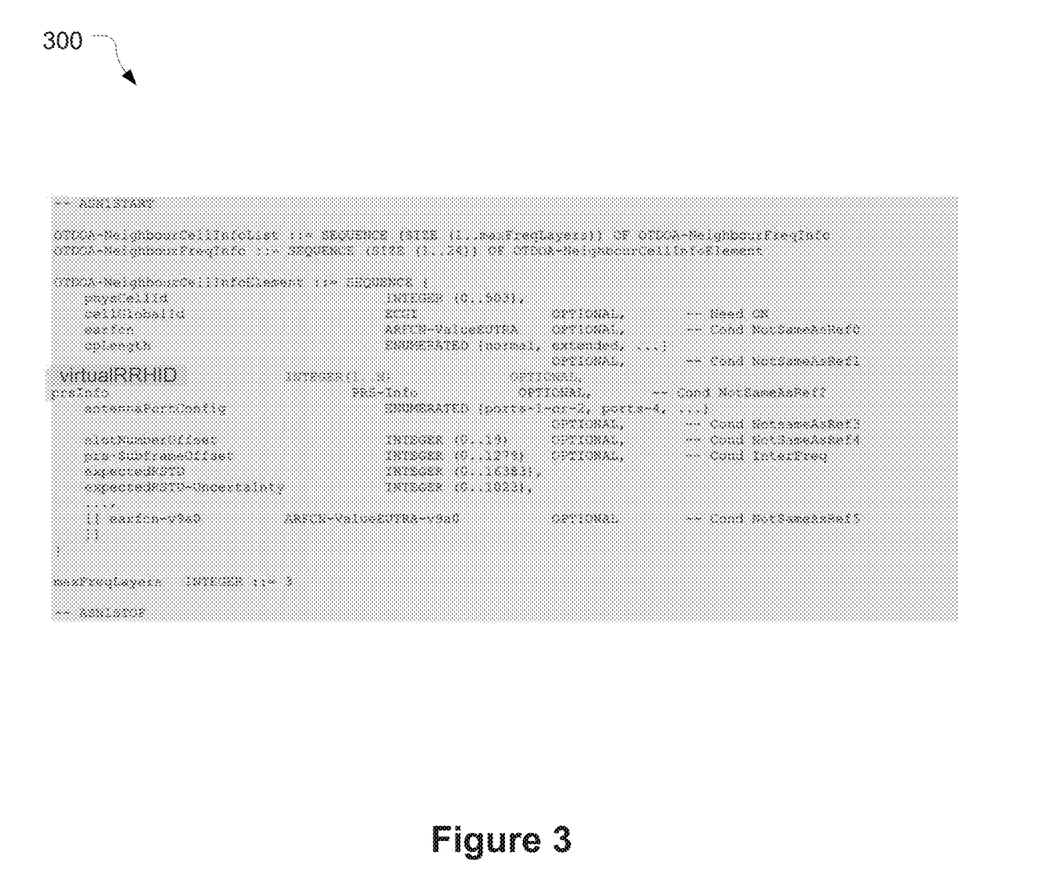
FIG. 3 is an observed time difference of arrival (OTDOA) neighbor cell information element (IE) in accordance with various embodiments.

FIG. 2 is a diagram 200 of a message flow between various components of the network 100 described above with respect to FIG. 1. The LBS server 152 may provide neighbor cell information, for example, information about eNB 116, to the UE 112 in a neighbor cell IE, for example, an OTDOA-NeighborCellInfoListIE. FIG. 3 illustrates an OTDOA-NeighborCellInfoListIE 300 in accordance with some embodiments. The OTDOA-NeighborCellInfoListIE 300 may include a list of positioning parameters of a number of neighbor cells. In some embodiments, the list may be arranged in a decreasing order of priority for measurement to be performed by a target device, with the first cell in the list being the highest priority for measurement. Other embodiments may include other list sortings. The target device may provide the available measurements in an order that corresponds to the sorting of the list within the OTDOA-NeighborCellInfoListIE 300.

The OTDOA-NeighborCellInfoListIE 300 may include a virtual RRH identifier, virtualRRHID, that corresponds to each RRH in the list of neighbor cells. The virtualRRHID may be an integer value that uniquely identifies an RRH from other RRHs associated with a common eNB. The virtualRRHID may be used to encode and decode a PRS transmitted by a corresponding RRH. The OTDOA-NeighborCellInfoListIE 300 may further include other positioning parameters such as, but not limited to, a cell identifier of the neighbor cell, PRS-info (for example, antenna port configuration, slot number offset, PRS subframe offset, etc.).

Figure 4:
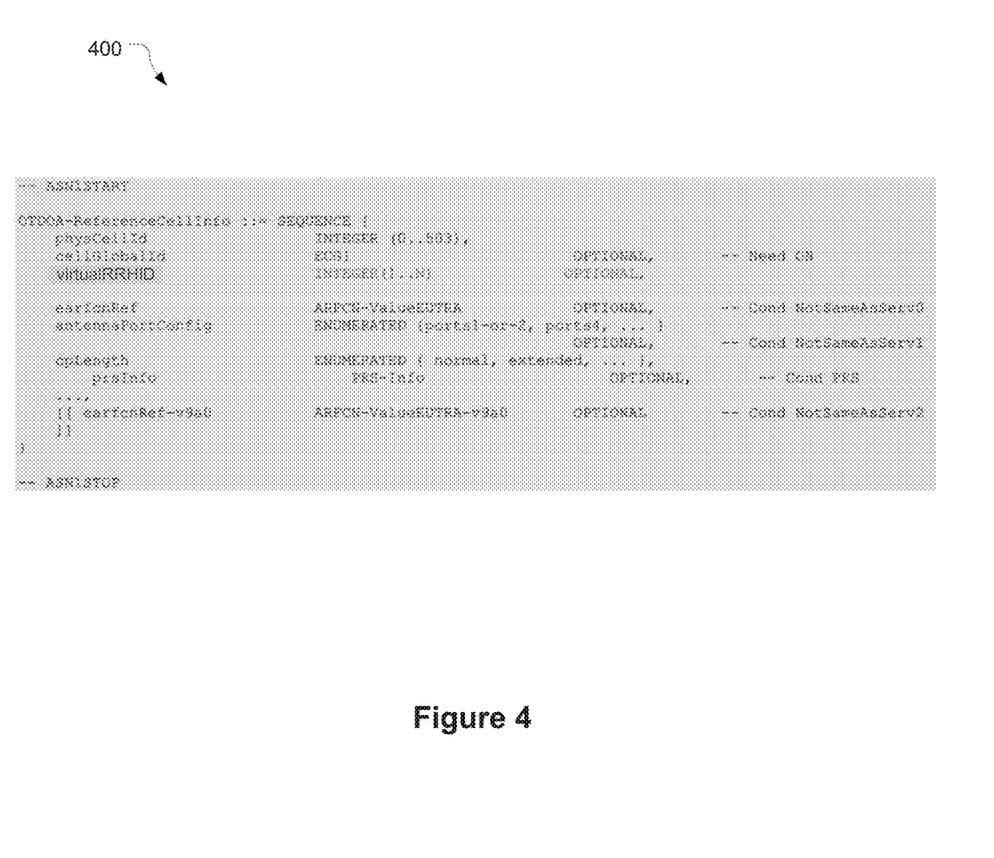
FIG. 4 is an OTDOA reference cell IE in accordance with various embodiments.

The LBS server 152 may provide assistance data reference cell information, for example, information about a cell provided by eNB 120, to the UE 112 in an OTDOA-ReferenceCellInfoIE. FIG. 4 illustrates an OTDOA-ReferenceCellInfoIE 400 in accordance with some embodiments. The OTDOA-ReferenceCellInfoIE 400 may include a list of positioning parameters of a reference cell, which may or may not be a serving cell of the UE. Similar to the OTDOA-NeighborCellInfoListIE 300, OTDOA-ReferenceCellInfoIE 400 may include one or more virtualRRHIDs that respectively correspond to RRHs of the reference cell, for example, a cell provided by CoMP system 124.

The OTDOA-NeighborCellInfoList and OTDOA-ReferenceCellInfoIEs may be disposed in an LTE positioning protocol (LPP) message generated by the LBS server 152. The LBS server 152 may transmit the LPP message to the UE 112. In some embodiments, generation and/or transmission of the LPP message may be performed by upper layers such as an LPP layer within the LBS server 152.

In some embodiments, the LBS server 152 may provide the LPP message to the MME/S-GW 144, which may package the LPP message as a NAS message and deliver it to the eNB 120. Upon receipt, the eNB 120 may package the LPP message as a radio resource control (RRC) message and deliver it to the UE 112.

In various embodiments, the LBS server 152 may also transmit LPP messages to the eNBs of the reference and neighbor cells to enable subsequent generation and transmission of PRSs from the various transmission points of the RAN 104.

Upon receiving the LPP message, the UE 112 may configure positioning measurement circuitry with the positioning parameters of the LPP message. Thereafter, the UE 112 may be capable of processing PRSs received from various transmission points of the RAN 104. For example, the UE 112 may receive a PRS from a neighboring eNB, for example, eNB 116, and from RRHs 128 and 132. Upon receiving the PRSs, the UE may perform positioning measurements, for example, reference signal time difference (RSTD), based on the PRSs, with the resulting positioning measurement data (e.g., RSTD data) reported, in a measurement report, to an enhanced serving mobile location center (ESMLC) in the eNB 120, for example. The ESMLC may use these RSTDs, and knowledge of the locations of the transmission points (e.g., the RRHs and eNBs) within the RAN 104, to estimate a location of the UE 112.

In some embodiments, the UE 112 may perform at least preliminary location estimates based on the positioning measurements and transmit the estimates in the measurement report.

Figure 5:
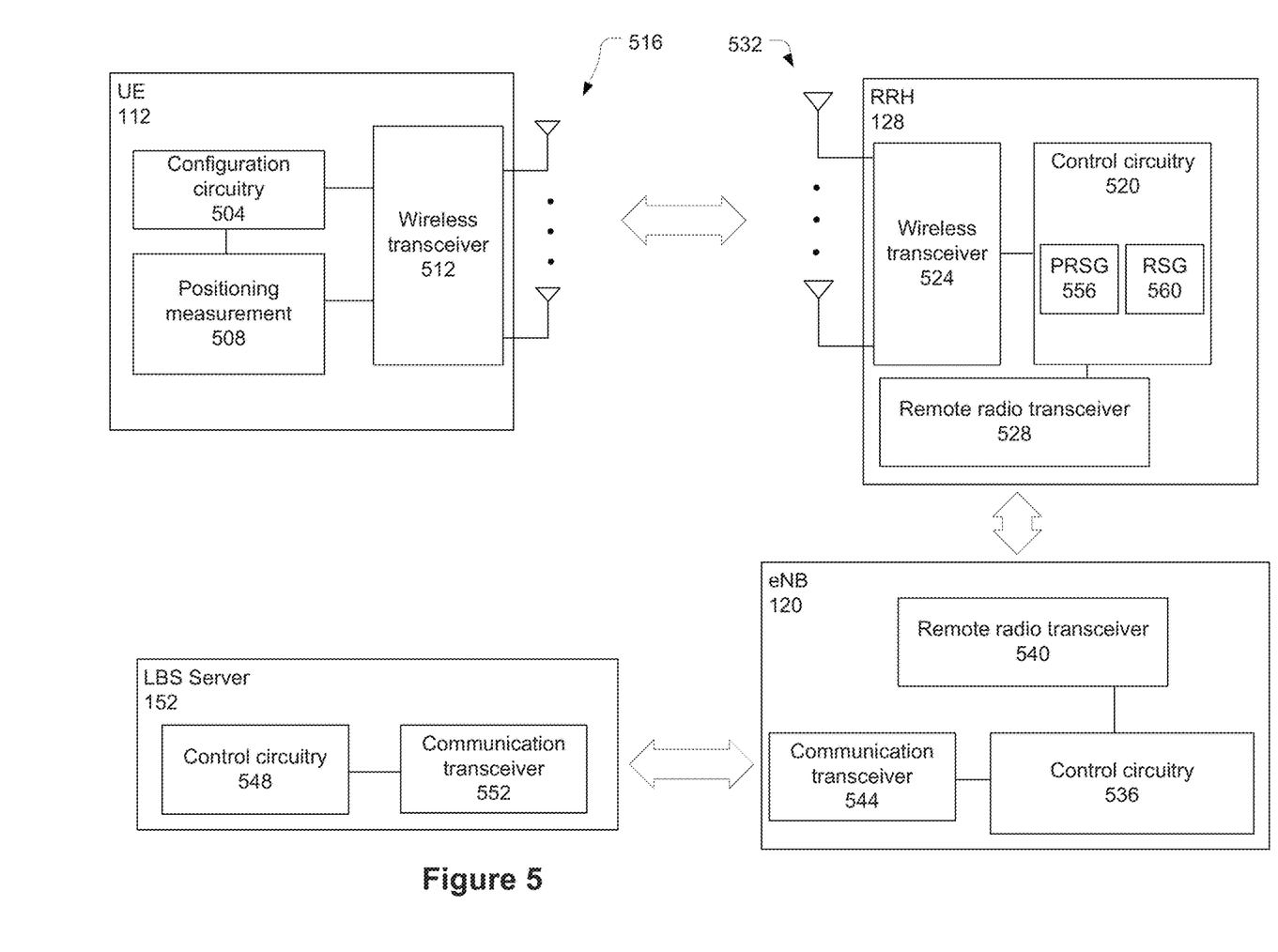
FIG. 5 is a block diagram of illustrative network components in accordance with various embodiments.

FIG. 5 illustrates various components of the network 100 in further detail in accordance with some embodiments of the present disclosure. For example, the UE 112 is shown with configuration circuitry 504 coupled with positioning measurement circuitry 508. Both the configuration circuitry 504 and the positioning measurement circuitry 508 may be coupled with a wireless transceiver 512 that is configured to facilitate over the air communication via one or more antennas 516.

The RRH 128 may include control circuitry 520 coupled with a wireless transceiver 524 and further coupled with a remote radio transceiver 528. The wireless transceiver 524 may be configured to facilitate over the air communication with the UE 112 via one or more antennas 532 of the RRH 128. The remote radio transceiver 528 may be configured to communicate with the eNB 120 over a high-speed communication link, for example, a fiber-optic link. The control circuitry 520 may be responsible for various transmission/reception operations. In some embodiments, the control circuitry 520 may generate and transmit PRSs to UEs of the RAN 104.

The eNB 120 may include control circuitry 536 coupled with a remote radio transceiver 540 and a communication transceiver 544. The remote radio transceiver 540 may be configured to facilitate communication with the RRH 128 over the high-speed communication link. Similarly, the communication transceiver 544 may be configured to facilitate communication with one or more elements of the core network 108 such as, for example, LBS server 152. The control circuitry 536 may control various communication aspects of the RAN 104 including, for example, operation of the RRHs of the CoMP system 124. In some embodiments, the control circuitry 536 may include an ESMLC that may be used for various positioning services such as, but not limited to, forwarding the LPP message to the UE 112, receiving the measurement report, and estimating a location of the UE 112.

The LBS server 152 may include control circuitry 548 that may be configured to perform various LPP-layer operations. The control circuitry 548 may be coupled with a communication transceiver 552 and may be configured to perform various positioning and location-based services.

The communication links, shown generally as block bidirectional arrows in FIG. 5, may be direct or indirect communication links. For example, the high-speed communication link coupling the RRH 128 with the eNB 120 may be a direct communication link; while the communication link coupling the eNB 120 with the LBS server 152 may be an indirect communication link that includes, for example, MME/S-GW 144.

Referring also to FIG. 2, the control circuitry 548 may determine a virtual identifier associated with RRH 128. This determination may be as a result of the virtual identifier being generated locally by the LBS server 152 and assigned to the RRH or, alternatively, the LBS server 152 may be provided with an indication of the virtual identifier from another component in the network 100. The control circuitry 548 may then generate an LPP message that includes, among other positioning parameters, an indication of the virtual identifier. The control circuitry 548 may then transmit the LPP message via the communication transceiver 552 to the UE 112.

The eNB 120 may receive the LPP message from the LBS server 152 via the communication transceiver 544. The control circuitry 536 may then configure various RRHs controlled by the eNB 120 with appropriate positioning parameters such as, but not limited to, virtual RRH IDs. With respect to RRH 128, the eNB 120 may transmit the LPP message to the RRH 128 via the remote radio transceiver 540. The LPP message may also be transmitted to the UE 112 by the RRH 128, the eNB 120, or another RRH.

In some embodiments, the control circuitry 536 may configure PRS bandwidth, for example the number of resource blocks used for transmission of a PRS signal, and the period at which a PRS is transmitted.

The control circuitry 520 of the RRH 128 may receive the LPP message from the eNB 120 via the remote radio transceiver 528. The control circuitry 520 may store the positioning parameters, including the virtual RRH ID, for later generation of PRSs.

The control circuitry 520 may include a pseudo-random sequence generator (PRSG) 556 and a reference signal generator (RSG) 560. The PRSG 556 may be initialized with an initialization sequence based on the virtual identifier of the RRH 128 to generate a pseudo-random sequence. In some embodiments, the initialization sequence may be defined by:

$$c_{init}=2^{10}*(7*(n_s+1)+l+1)*(2*N_{ID}^{cellCoMP}+1)+2*N_{ID}^{cellCoMP}+N_{CP},\qquad \text{Eq.1}$$

where $n_s$ is a number of a slot within a radio frame, l is an orthogonal frequency division multiplexing (OFDM) symbol number within the slot, $N_{ID}^{cellCoMP}$ is a function of a cell identifier, $N_{ID}^{cell}$, and the first virtual identifier, $N_{ID}^{virtualR\text{-}RHID}$, and $$N_{CP} = \begin{cases} 1 \text{ for normal cyclic prefix} \\ 0 \text{ for extended cyclic prefix} \end{cases}.$$

In some embodiments, the pseudo-random sequence may be defined by a link-31 Gold sequence. The output sequence c(n) of length $M_{PN}$, where n=0, 1, ... $M_{PN}$-1, is defined by:

$$c(n)=(x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \qquad \text{Eq.2}$$

where $N_c$=1600 and the first m-sequence may be initialized with $x_1(0)$=1, $x_1(n)$=0, n=1, 2, ..., 30. Initialization of the second m-sequence may be denoted by $c_{init}=\Sigma_{i=0}^{30}x_2(i)\cdot 2^i$ with the value depending on the application of the sequence.

The pseudo-random sequence c(n) generated by the PRSG 556 may be provided to the RSG 560, which may generate a PRS based on the pseudo-random sequence. In some embodiments, the PRS may be defined in the physical layer by:

$$r_{L,n_s}(m) = \frac{1}{\sqrt{2}}(1-2*c(2m)) + j\frac{1}{\sqrt{2}}(1-2*c(2m+1)), \qquad \text{Eq. 3}$$

$$m = 0, 1, \ldots, 2N_{RB}^{max,DL}-1.$$

The control circuitry 520 may transmit the PRS via the wireless transceiver 524 according to the PRS bandwidth and periodicity configurations provided by the eNB 120. In some embodiments, the PRS may be transmitted on antenna port 6 using a configurable number of consecutive subframes.

In some embodiments, some or all of the functions of the control circuitry 520 may be employed in control circuitry 536. In such embodiments, the RRH 128 may be used primarily for operations provided by wireless transceiver 524 and antennas 532.

The configuration circuitry 504 of the UE 112 may receive the LPP message from the eNB 120, for example. The configuration circuitry 504 may configure the positioning parameters based on the LPP message.

The positioning measurement circuitry 508 may observe the PRS sent from the RRH 128 (and other transmission points in the RAN 104). Observation of the PRS sent from the RRH 128 may be facilitated by prior configuration of the positioning parameters including the virtual RRH ID. This may allow the positioning measurement circuitry 508 to uniquely identify a PRS as coming from RRH 128 as opposed to coming from RRH 132, for example. The positioning measurement circuitry 508 may perform measurements based on the observed PRSs. In various embodiments, the measurements may include, but are not limited to, OTDOA measurements such as RSTD.

The positioning measurement circuitry 508 may then generate a measurement report and transmit the measurement report to an eNB of a serving cell, for example, eNB 120.

As discussed above, in some embodiments, the positioning measurement circuitry 508 may simply perform measurements based on the PRSs with the measurement results being fed back to the eNB. At that point, the eNB may estimate a location of the UE. In other embodiments, the positioning measurement circuitry 508 may perform at least preliminary estimations of the UE location.

Transmitting PRSs from RRHs based on virtual identities of the RRHs may facilitate positioning operations in a number of ways. For example, a UE with knowledge of the virtual IDs of the RRHs may be capable of identifying the individual PRSs with less interference from other PRSs. Further, the measurement results may be associated with a higher degree of accuracy given that a larger number of distinct PRSs may be used in the calculations.

Figure 6:
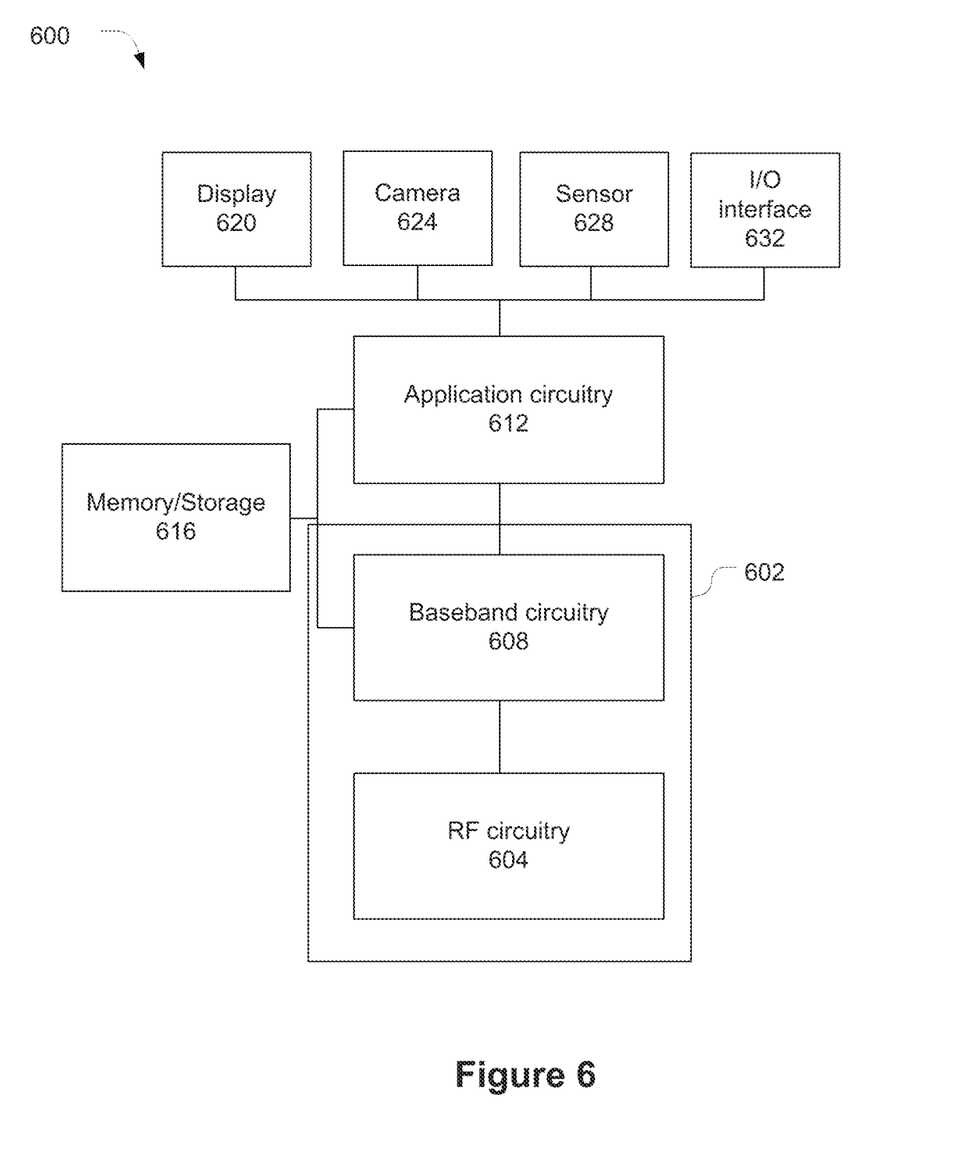
FIG. 6 is a block diagram of an example computing device that may be used to practice various embodiments described herein.

A UE, RRH, eNB, and/or LBS server as described herein may be implemented into a system using any suitable hardware and/or software to configure as desired. FIG. 6 illustrates, for one embodiment, an example system 600 comprising interface circuitry 602 (which may include radio frequency (RF) circuitry 604 and baseband circuitry 608 in some embodiments), application circuitry 612, memory/storage 616, display 620, camera 624, sensor 628, and input/output (I/O) interface 632, coupled with each other at least as shown.

The application circuitry 612 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 616 and configured to execute instructions stored in the memory/storage 616 to enable various applications and/or operating systems running on the system 600.

Interface circuitry 602 may include circuitry such as, but not limited to, one or more single-core or multi-core processors designed to provide suitable communication interfaces for respective device and networking applications. While the interface circuitry 602 is shown in FIG. 6 with baseband and RF circuitry, these components may not be included in a device that does not participate directly in wireless transmission/reception.

The baseband circuitry 608 may include circuitry such as, but not limited to, one or more single-core or multi-core processors. The processor(s) may include a baseband processor. The baseband circuitry 608 may handle various radio control functions that enable communication with one or more radio networks via the RF circuitry. The radio control functions may include, but are not limited to, signal modulation, encoding, decoding, radio frequency shifting, etc. In some embodiments, the baseband circuitry 608 may provide for communication compatible with one or more radio technologies. For example, in some embodiments, the baseband circuitry 608 may support communication with an E-UTRAN and/or other wireless metropolitan area networks (WMAN), a wireless local area network (WLAN), or a wireless personal area network (WPAN). Embodiments in which the baseband circuitry 608 is configured to support radio communications of more than one wireless protocol may be referred to as multi-mode baseband circuitry.

In various embodiments, baseband circuitry 608 may include circuitry to operate with signals that are not strictly considered as being in a baseband frequency. For example, in some embodiments, baseband circuitry 608 may include circuitry to operate with signals having an intermediate frequency, which is between a baseband frequency and a radio frequency.

RF circuitry 604 may enable communication with wireless networks using modulated electromagnetic radiation through a non-solid medium. In various embodiments, the RF circuitry 604 may include switches, filters, amplifiers, etc., to facilitate the communication with the wireless network.

In various embodiments, RF circuitry 604 may include circuitry to operate with signals that are not strictly considered as being in a radio frequency. For example, in some embodiments, RF circuitry 604 may include circuitry to operate with signals having an intermediate frequency, which is between a baseband frequency and a radio frequency.

In some embodiments, some or all of the constituent components of the baseband circuitry 608, the application circuitry 612, and/or the memory/storage 616 may be implemented together on a system on a chip (SOC).

In an embodiment in which the system 600 represents an eNB, for example, eNB 120, the remote radio transceiver 540, the communication transceiver 544, and the control circuitry 536 may be implemented in the interface circuitry 602 and/or application circuitry 612.

In an embodiment in which the system 600 represents a UE, for example, UE 112, the configuration circuitry 504, positioning measurement circuitry 508, and/or wireless transceiver 512 may be implemented in the RF circuitry 604, the baseband circuitry 608, and/or the application circuitry 612.

In an embodiment in which the system 600 represents an RRH, for example, RRH 128, the control circuitry 520, the wireless transceiver 524, and the remote radio transceiver 528 may be implemented in the interface circuitry 602 and/or the application circuitry 612.

In an embodiment in which the system 600 represents an LBS server, for example, LBS server 152, the control circuitry 548 and the communication transceiver 522 may be implemented in the application circuitry 612 and/or the interface circuitry 602.

Memory/storage 616 may be used to load and store data and/or instructions, for example, for system 600. Memory/storage 616 for one embodiment may include any combination of suitable volatile memory (e.g., dynamic random access memory (DRAM)) and/or non-volatile memory (e.g., Flash memory).

In various embodiments, the I/O interface 632 may include one or more user interfaces designed to enable user interaction with the system 600 and/or peripheral component interfaces designed to enable peripheral component interaction with the system 600. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 628 may include one or more sensing devices to determine environmental conditions and/or location information related to the system 600. In some embodiments, the sensors may include, but are not limited to, a gyro sensor, an accelerometer, a proximity sensor, an ambient light sensor, and a positioning unit. The positioning unit may also be part of, or interact with, the baseband circuitry 608 and/or RF circuitry 604 to communicate with components of a positioning network, e.g., a global positioning system (GPS) satellite.

In various embodiments, the display 620 may include a display (e.g., a liquid crystal display, a touch screen display, etc.).

In various embodiments, the system 600 may be a mobile computing device such as, but not limited to, a laptop computing device, a tablet computing device, a netbook, an ultrabook, a smartphone, etc. In various embodiments, system 600 may have more or less components, and/or different architectures.

The following paragraphs describe examples of various embodiments.

Example 1 includes a location-based services (LBS) server comprising: a transceiver; and control circuitry coupled with the transceiver, the control circuitry to: determine a virtual identifier associated with a remote radio head (RRH) of a coordinated multipoint (CoMP) system that includes the RRH and an eNB; generate a long-term evolution (LTE) positioning protocol (LPP) message that includes an indication of the virtual identifier; and transmit, through the transceiver, the LPP message to a user equipment (UE).

Example 2 includes the LBS server of Example 1, wherein the LPP message is to include observed time difference of arrival (OTDOA) assistance data and is to indicate a positioning reference signal (PRS) configuration for the RRH.

Example 3 includes the LBS server of Example 1, wherein the UE is to be served by the CoMP system at a time of transmission of the LPP message and the indication of the virtual identifier is to be included in an observed time difference of arrival (OTDOA) reference cell information IE.

Example 4 includes the LBS server of Example 1, wherein the UE is not to be served by the CoMP system at a time of transmission of the LPP message and the indication of the virtual identifier is to be included in an observed time difference of arrival (OTDOA) neighbor cell information list IE.

Example 5 includes the LBS server of Example 1, wherein the transceiver is to receive a message from the eNB, and the control circuitry is to determine the virtual identifier based on the message.

Example 6 includes the LBS server of any of Examples 1-5, wherein the control circuitry is to determine a plurality of virtual identifiers that are respectively associated with a plurality of RRHs of the CoMP system and to generate the LPP message to include indications of the plurality of virtual identifiers.

Example 7 includes the LBS server of Example 6, wherein the plurality of RRHs are associated with a common physical cell identity.

Example 8 includes remote radio head (RRH) circuitry of a coordinated multipoint (CoMP) system, the RRH circuitry comprising: a wireless transceiver to facilitate communications with one or more user equipments (UEs); and control circuitry coupled with the wireless transceiver, the control circuitry to: transmit, via the wireless transceiver, a positioning reference signal (PRS) that is based on a virtual identifier associated with the RRH.

Example 9 includes the RRH circuitry of Example 8, wherein the control circuitry is to periodically transmit the PRS.

Example 10 includes the RRH circuitry of Example 8 or 9, wherein the control circuitry comprises: a pseudo-random sequence generator to be initialized with a first initialization sequence based on the virtual identifier to generate a first pseudo-random sequence; and a reference signal generator to generate the PRS based on the first pseudo-random sequence.

Example 11 includes the RRH circuitry of Example 9, wherein the first initialization sequence is defined by: $c_{init}=2^{10}*(7*(n_s+1)+l+1)*(2*N_{ID}^{cellCoMP}+1)+2*N_{ID}^{cellCoMP}+N_{CP}$, where $n_s$ is number of a slot within a radio frame, l is an orthogonal frequency division multiplexing (OFDM) symbol number within the slot, $N_{ID}^{cellComP}$ is a function of a cell identifier, $N_{ID}^{cell}$, and the first virtual identifier, $N_{ID}^{virtualRRHID}$, and $$N_{CP} = \begin{cases} 1 \text{ for normal cyclic prefix} \\ 0 \text{ for extended cyclic prefix} \end{cases}.$$

Example 12 includes the RRH circuitry of Example 11, wherein the PRS is defined by:

$$r_{l,n_s}(m) = \frac{1}{\sqrt{2}}(1-2\cdot c(2m)) + j\frac{1}{\sqrt{2}}(1-2\cdot c(2m+1)),$$

$$m = 0, 1, \ldots, 2N_{RB}^{max,DL} - 1.$$

Example 13 includes user equipment (UE) circuitry comprising: configuration circuitry to receive a long-term evolution (LTE) positioning protocol (LPP) message that includes an indication of a virtual identifier of a remote radio head (RRH); and positioning measurement circuitry coupled with the configuration circuitry, the positioning measurement circuitry to: receive a positioning reference signal (PRS) from the RRH; process the PRS based on the virtual identifier; and generate positioning measurement and estimation data based on the processed PRS.

Example 14 includes the UE circuitry of Example 13, wherein the positioning measurement data includes reference signal time difference (RSTD) data and the positioning measurement circuitry is further to: generate a measurement report that includes the RSTD data; and send the measurement report to a serving eNB.

Example 15 includes the UE circuitry of Example 13, wherein the configuration circuitry is further to receive indications of virtual identifiers of a plurality of RRHs.

Example 16 includes the UE circuitry of Example 13, wherein the configuration circuitry is to receive the indication of the virtual identifier in an observed time difference of arrival (OTDOA) reference cell information IE or in an OTDOA neighbor cell information list IE.

Example 17 includes the UE circuitry of any of Examples 13-16, wherein the positioning measurement circuitry is to generate an estimate of a location of the UE based on the PRS.

Example 18 includes a coordinated multipoint (CoMP) system comprising: a plurality of remote radio heads (RRHs); and an eNB to facilitate radio access network (RAN) communications through the plurality of RRHs, the eNB to include control circuitry coupled with a remote-radio transceiver to: control a first RRH of the plurality of RRHs to transmit a first positioning reference signal (PRS) based on a first virtual identifier associated with the first RRH; and control a second RRH of the plurality of RRHs to generate a second PRS based on a second virtual identifier associated with the second RRH, wherein the first virtual identifier differs from the second virtual identifier.

Example 19 includes the CoMP system of Example 18, wherein the first RRH includes: a pseudo-random sequence generator to be initialized with a first initialization sequence based on the first virtual identifier to generate a first pseudo-random sequence; and a reference signal generator to generate the first PRS based on the first pseudo-random sequence.

Example 20 includes the CoMP system of Example 19, wherein the second RRH includes: a pseudo-random sequence generator to be initialized with a second initialization sequence based on the second virtual identifier to generate a second pseudo-random sequence; and a reference signal generator to generate the second PRS based on the second pseudo-random sequence.

Example 21 includes the CoMP system of Example 19, wherein the first initialization sequence is defined by: $c_{init}=2^{10}*(7*(n_s+1)+l+1)*(2*N_{ID}^{cellCoMP}+1)+2*N_{ID}^{cellCoMP}+N_{CP}$, where $n_s$ is a number of a slot within a radio frame, l is an orthogonal frequency division multiplexing (OFDM) symbol within the slot, $N_{ID}^{cellCoMP}$ is a function of a cell identifier, $N_{ID}^{cell}$, and the first virtual identifier, $N_{ID}^{virtualRRHID}$, and $$N_{CP} = \begin{cases} 1 \text{ for normal cyclic prefix} \\ 0 \text{ for extended cyclic prefix} \end{cases}.$$

Example 22 includes the CoMP system of Example 21, wherein the PRS is defined by:

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max,DL} - 1.$$

Example 23 includes the CoMP system of any of Examples 18-22, further comprising: a plurality of fiber-optic links to communicatively couple the eNB to the plurality of RRHs.

Example 24 includes a method comprising: receiving a long-term evolution (LTE) positioning protocol (LPP) message that includes an indication of a virtual identifier of a remote radio head (RRH); receiving a positioning reference signal (PRS) from the RRH; processing the PRS based on the virtual identifier; and generating positioning measurement and estimation data based on the processed PRS signal.

Example 25 includes the method of Example 24, further comprising: generating a measurement report that includes the positioning measurement and estimation data; and transmitting the measurement report to a serving eNB.

Example 26 includes one or more non-transitory computer-readable media having instructions that, when executed, cause a remote radio head (RRH) to: transmit, via a wireless transceiver, a positioning reference signal (PRS) that is based on a virtual identifier associated with the RRH.

Example 27 includes the one or more non-transitory computer-readable media of Example 26, wherein the instructions, when executed, further cause the RRH to periodically transmit the PRS.

Example 28 includes the one or more non-transitory computer-readable media of Example 26 or 27, wherein the instructions, when executed, further cause the RRH to: initialize a pseudo-random sequence generator with a first initialization sequence based on the virtual identifier to generate a first pseudo-random sequence; and to generate the PRS based on the first pseudo-random sequence.

Example 29 includes the one or more non-transitory computer-readable media of Example 28, wherein the first initialization sequence is defined by:

$$c_{init}=2^{10}*(7*(n_s+1)+l+1)*(2*N_{ID}^{cellCoMP}+1)+2*N_{ID}^{cellCoMP}+N_{CP}$$

where $n_s$ is a number of a slot within a radio frame, l is an orthogonal frequency division multiplexing (OFDM) symbol number within the slot, $N_{ID}^{cellCoMP}$ is a function of a cell identifier, $N_{ID}^{cell}$, and the first virtual identifier, $N_{ID}^{virtualR\_RHID}$, and $$N_{CP} = \begin{cases} 1 \text{ for normal cyclic prefix} \\ 0 \text{ for extended cyclic prefix} \end{cases}.$$

Example 30 includes the one or more non-transitory computer-readable media of Example 29, wherein the PRS is defined by:

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max,DL} - 1.$$

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. One or more non-transitory, computer-readable media having instructions that, when executed by one or more processors of a device, cause the device to:

receive a long-term evolution (LTE) positioning protocol (LPP) message that includes indications of a physical cell identifier and virtual identifiers of remote radio heads (RRHs) of a coordinated multipoint (CoMP) system in an observed time difference of arrival (OTDOA) cell information list data element;

receive a positioning reference signal (PRS) from a first RRH, wherein the PRS is based on a pseudo-random sequence that is generated using a virtual identifier of the first RRH and the physical cell identifier of a physical cell in which the first RRH resides;

process the PRS based on indications of the physical cell identifier and the virtual identifier of the first RRH from the LPP message; and generate positioning measurement data based on the processed PRS.

2. The one or more non-transitory, computer-readable media of claim 1, wherein the instructions, when executed, further cause the device to:

generate a measurement report that includes the positioning measurement data; and transmit the measurement report to a serving eNB.

3. The one or more non-transitory, computer-readable media of claim 1, wherein the PRS is a first PRS, the pseudo-random sequence is a first pseudo-random sequence, and the instructions, when executed, further cause the device to:

receive a second PRS from a second RRH, wherein the second PRS is based on a second pseudo-random sequence that is generated using a virtual identifier of the second RRH and the physical cell identifier of the physical cell in which the second RRH resides;

process the second PRS based on indications of the virtual identifier of the second RRH and the physical cell identifier of the physical cell; and generate the positioning measurement data based further on the processed second PRS.

4. The one or more non-transitory, computer-readable media of claim 1, wherein the OTDOA cell information list data element is a neighbor cell information list data element or a reference cell information list data element.

5. The one or more non-transitory, computer-readable media of claim 1, wherein the PRS is based on an initialization sequence used to generate the pseudo-random sequence, wherein the initialization sequence is defined by:

$$c_{init}=2^{10}*(7*(n_s+1)+l+1)*(2*N_{ID}^{cellCoMP}+1)+2*N_{ID}^{cellCoMP}+N_{CP},$$

where $n_s$ is a number of a slot within a radio frame, l is an orthogonal frequency division multiplexing symbol number within the slot, $N_{ID}^{cellCoMP}$ is a function of the physical cell identifier and the virtual identifier, and $$N_{CP} = \begin{cases} 1 \text{ for normal cyclic prefix} \\ 0 \text{ for extended cyclic prefix} \end{cases}.$$

6. An apparatus to be implemented by a user equipment, the apparatus comprising:

configuration circuitry to receive a message from a location-based server, the message to include indications of a physical cell identifier and virtual identifiers of remote radio heads (RRHs) of a coordinated multipoint (CoMP) system in an observed time difference of arrival (OTDOA) cell information list data element; and positioning measurement circuitry, coupled with the configuration circuitry, to:

receive a positioning reference signal (PRS) from a first RRH, wherein the PRS is based on a pseudo-random sequence that is generated using a virtual identifier of the first RRH and the physical cell identifier of a physical cell in which the first RRH resides;

process the PRS based on indications of the physical cell identifier and the virtual identifier of the first RRH from the LPP message; and generate positioning measurement data based on the processed PRS.

7. The apparatus of claim 6, wherein the positioning measurement circuitry is further to:

generate a measurement report that includes the positioning measurement data; and cause a wireless transceiver of the user equipment to transmit the measurement report to a serving eNB.

8. The apparatus of claim 6, wherein the PRS is a first PRS, the pseudo-random sequence is a first pseudo-random sequence, and:

the configuration circuitry is further to: receive a second PRS from a second RRH, wherein the second PRS is based on a second pseudo-random sequence that is generated using a virtual identifier of the second RRH and the physical cell identifier of the physical cell in which the second RRH resides; and the positioning measurement circuitry is further to: process the second PRS based on indications of the virtual identifier of the second RRH and the physical cell identifier of the physical cell; and generate the positioning measurement data based further on the processed second PRS.

9. The apparatus of claim 6, wherein the OTDOA cell information list data element is a neighbor cell information list data element or a reference cell information list data element.

10. The apparatus of claim 6, wherein the PRS is based on an initialization sequence used to generate the pseudo-random sequence, wherein the initialization sequence is defined by:

$$c_{init}=2^{10}*(7*(n_s+1)+l+1)*(2*N_{ID}^{cellCoMP}+1)+2*N_{ID}^{cellCoMP}+N_{CP},$$

where $n_s$ is a number of a slot within a radio frame, l is an orthogonal frequency division multiplexing symbol number within the slot, $N_{ID}^{cellCoMP}$ is a function of the physical cell identifier and the virtual identifier, and $$N_{CP} = \begin{cases} 1 \text{ for normal cyclic prefix} \\ 0 \text{ for extended cyclic prefix} \end{cases}.$$

* * * * *